US012480465B2

(12) United States Patent
Usui et al.

(10) Patent No.: US 12,480,465 B2
(45) Date of Patent: Nov. 25, 2025

(54) FUEL PUMP

(71) Applicant: Hitachi Astemo, Ltd., Hitachinaka (JP)

(72) Inventors: Satoshi Usui, Hitachinaka (JP); Minoru Hashida, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/037,538

(22) PCT Filed: Aug. 30, 2021

(86) PCT No.: PCT/JP2021/031699
§ 371 (c)(1),
(2) Date: May 17, 2023

(87) PCT Pub. No.: WO2022/190410
PCT Pub. Date: Sep. 15, 2022

(65) Prior Publication Data

US 2024/0003322 A1 Jan. 4, 2024

(30) Foreign Application Priority Data

Mar. 9, 2021 (JP) ................................ 2021-036985

(51) Int. Cl.
*F02M 59/44* (2006.01)
*F04B 53/16* (2006.01)
(Continued)

(52) U.S. Cl.
CPC ........... *F02M 59/442* (2013.01); *F04B 53/16* (2013.01); *F16J 10/04* (2013.01);
(Continued)

(58) Field of Classification Search
CPC .......... F02M 59/442; F02M 2200/8061; F04B 9/042; F04B 11/0091; F04B 53/16; F16J 10/04
(Continued)

(56) References Cited

U.S. PATENT DOCUMENTS 5,899,136 A * 5/1999 Tarr .................... F02M 59/442 123/495
8,382,458 B2 2/2013 Hashida et al.
(Continued)

FOREIGN PATENT DOCUMENTS

DE 102016201039 A1 2/2017
JP 2008-025425 A 2/2008
(Continued)

OTHER PUBLICATIONS

WO 2021197684 (Year: 2021).*
(Continued)

*Primary Examiner* — Essama Omgba
*Assistant Examiner* — Joseph S. Herrmann
(74) *Attorney, Agent, or Firm* — Volpe Koenig

(57) ABSTRACT

The present invention provides a fuel pump capable of discharging fuel at high pressure and suppressing sticking between a plunger and a cylinder. A high-pressure fuel supply pump includes a plunger that reciprocates, a cylinder in which a guide hole for guiding a reciprocating motion of the plunger extends in an axial direction, and a pump body including a third room (cylinder insertion hole) into which the cylinder is press-fitted, and a pressurizing chamber that communicates with the third room and has a volume increased or decreased by the reciprocating motion of the plunger. The pressure of a fixed gap generated between the
(Continued)

cylinder and the pump body is set to be equal to or higher than pressure of a sliding gap generated between the plunger and the cylinder.

6 Claims, 8 Drawing Sheets

(51) Int. Cl.
*F16J 10/04* (2006.01)
*F04B 9/04* (2006.01)
*F04B 11/00* (2006.01)

(52) U.S. Cl.
CPC ...... *F02M 2200/8061* (2013.01); *F04B 9/042* (2013.01); *F04B 11/0091* (2013.01)

(58) Field of Classification Search
USPC .............................................. 92/169.4, 171.1
See application file for complete search history.

(56) References Cited

U.S. PATENT DOCUMENTS

| | | | | |
|---|---|---|---|---|
| 8,757,047 | B2 * | 6/2014 | Benson ................ | F02M 59/442<br>277/411 |
| 10,890,151 | B2 | 1/2021 | Tokumaru et al. | |
| 2008/0019853 | A1 | 1/2008 | Hashida et al. | |
| 2020/0049116 | A1 | 2/2020 | Tokumaru et al. | |
| 2021/0207567 | A1 | 7/2021 | Tamura et al. | |
| 2023/0096056 | A1 | 3/2023 | Schetter | |

FOREIGN PATENT DOCUMENTS

| | | | | |
|---|---|---|---|---|
| JP | 2010-229914 | A | | 10/2010 |
| KR | 20220156955 | | * | 11/2022 |
| WO | 2018/186219 | A1 | | 10/2018 |
| WO | 2019/131049 | A1 | | 7/2019 |
| WO | 2021/185508 | A1 | | 9/2021 |
| WO | WO 2021/197684 | A1 | * | 10/2021 |

OTHER PUBLICATIONS

International Search Report with English Translation, PCT/JP2021/031699, Nov. 16, 2021 (4 pgs).
Extended European Search Report issued on Dec. 20, 2024 for European Patent Application No. 21930259.3.

* cited by examiner

FUEL PUMP

TECHNICAL FIELD

The present invention relates to a fuel pump that supplies fuel to an engine at high pressure.

BACKGROUND ART

A fuel pump is disclosed in PTL 1, for example. The high-pressure fuel supply pump disclosed in PTL 1 includes a housing, a suction valve, a discharge valve, and a relief valve. The housing includes a cylinder that accommodates a cylinder liner that slidably holds a plunger and is a stepped space that forms a pressurizing chamber. The suction valve is opened in a state where no current is supplied to an electromagnetic solenoid. When a current is supplied to the electromagnetic solenoid, the suction valve is opened to cause the fuel to be sucked into the pressurizing chamber.

The discharge valve is assembled to a discharge valve accommodating portion of the housing. The discharge valve accommodating portion communicates with the pressurizing chamber via a fuel discharge hole. The high-pressure fuel pressurized in the pressurizing chamber is supplied to the discharge valve. The discharge valve is opened when the pressure of the supplied fuel becomes equal to or higher than predetermined pressure, and the fuel that has passed through the discharge valve is pressure-fed to an accumulator.

The relief valve is assembled to a relief valve accommodating portion of the housing. The relief valve accommodating portion communicates with a high-pressure region on the downstream side of the discharge valve and communicates with the pressurizing chamber via a communication passage. The relief valve is opened when the pressure of the fuel in the high-pressure region becomes equal to or higher than specific pressure, and thus, brings the high-pressure fuel back to the pressurizing chamber.

The high-pressure fuel supply pump disclosed in PTL 1 has a structure in which a flat portion of a cylinder is pressed against a flat portion of a body. A pressing portion between the flat portion of the cylinder and the flat portion of the body is referred to as a "surface pressing portion" below.

CITATION LIST

Patent Literature

PTL 1: International Publication No. 2018/186219

SUMMARY OF INVENTION

Technical Problem

Incidentally, the sealability of the surface pressing portion is not stable. That is, it is possible to prevent the fuel from entering (passing through) in a certain individual (high-pressure fuel supply pump), but it is impossible to prevent the fuel from entering (passing through) in another individual (high-pressure fuel supply pump). In addition, even in the same individual (high-pressure fuel supply pump), entering the fuel (passing through) may be prevented or may not be prevented, depending on the operation conditions or the environment.

When the pressure (referred to as "pressurizing chamber pressure" below) of a pressurizing chamber is high, the pressure becomes the same as the pressurizing chamber pressure at the end on the pressurizing chamber side in a minute sliding gap between the plunger and the cylinder. The pressure in the sliding gap gradually decreases toward the opposite side of the pressurizing chamber side, and becomes low pressure (the same pressure as the pressure in an auxiliary chamber) at the end on an opposite side of the pressurizing chamber side.

When the fuel can be completely sealed at the surface pressing portion between the cylinder and the body, the pressurizing chamber pressure does not reach the outer peripheral surface of the cylinder. Therefore, the pressure of the sliding gap between the plunger and the cylinder is higher than the pressure of the outer peripheral surface of the cylinder. Thus, the sliding gap expands, and the fuel leaking from the sliding gap increases. As a result, a first problem occurs that the discharge amount of the high-pressure fuel is small, or the volumetric efficiency is low, and it is not possible to discharge the fuel of an amount required by the engine at high pressure. In order to solve the first problem, it is necessary to reduce the sliding gap.

On the other hand, when it is not possible to completely seal the fuel at the surface pressing portion between the cylinder and the body, the pressurizing chamber pressure reaches the outer peripheral surface of the cylinder. Therefore, the pressure of the sliding gap between the plunger and the cylinder is lower than the pressure of the outer peripheral surface of the cylinder. This causes a second problem that the sliding gap becomes small, or the sliding gap becomes zero, and the plunger and the cylinder stick to each other. When the sliding gap is reduced in order to secure a discharge flow rate at a high pressure, the plunger and the cylinder are easily stuck.

As described above, since the sealability is not stable in the surface pressing portion, the first problem may occur in one individual, and the second problem may occur in another individual. Even in the same individual, the first problem may occur under a certain condition, and the second problem may occur under another condition.

Considering the above problems, an object of the present invention is to provide a fuel pump capable of discharging fuel at high pressure and suppressing sticking between a plunger and a cylinder.

Solution to Problem

In order to solve the above problems and achieve the object of the present invention, according to the present invention, a fuel pump includes a plunger that reciprocates, a cylinder in which a guide hole for guiding a reciprocating motion of the plunger extends in an axial direction, and a pump body including a cylinder insertion hole into which the cylinder is press-fitted, and a pressurizing chamber that communicates with the cylinder insertion hole and has a volume increased or decreased by the reciprocating motion of the plunger. The pressure of a fixed gap generated between the cylinder and the pump body is set to be equal to or higher than pressure of a sliding gap generated between the plunger and the cylinder.

Advantageous Effects of Invention

According to the fuel pump having the above configuration, it is possible to discharge the fuel at high pressure, and to suppress sticking between the plunger and the cylinder.

Objects, configurations, and advantageous effects other than those described above will be clarified by the descriptions of the following embodiments.

DESCRIPTION OF EMBODIMENTS

1. First Embodiment

Figure 1:
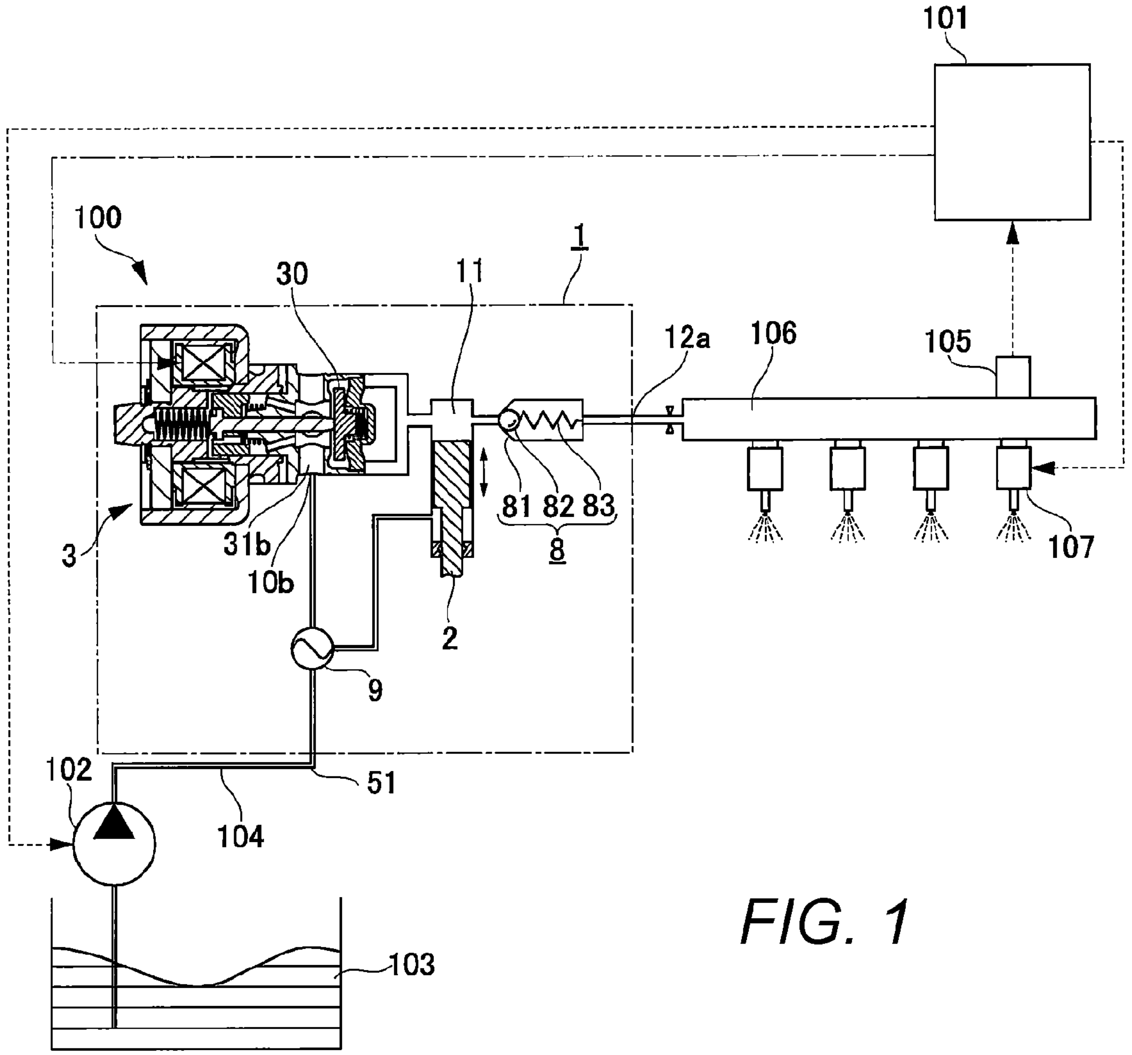
FIG. 1 is an overall configuration diagram illustrating a fuel supply system using a high-pressure fuel supply pump according to a first embodiment of the present invention.

Hereinafter, a high-pressure fuel supply pump according to a first embodiment of the present invention will be described. In the drawings, the common members are denoted by the same reference signs.

[Fuel Supply System]

Next, a fuel supply system using the high-pressure fuel supply pump (fuel pump) according to the present embodiment will be described with reference to FIG. 1.

FIG. 1 is an overall configuration diagram illustrating the fuel supply system using the high-pressure fuel supply pump according to the embodiment.

As illustrated in FIG. 1, the fuel supply system includes a high-pressure fuel supply pump (fuel pump) 100, an engine control unit (ECU) 101, a fuel tank 103, a common rail 106, and a plurality of injectors 107. The components of the high-pressure fuel supply pump 100 are integrally incorporated in the pump body 1.

The fuel in the fuel tank 103 is pumped up by a feed pump 102 that drives based on a signal from the ECU 101. The pumped fuel is pressurized to appropriate pressure by a pressure regulator (not illustrated) and fed to a low-pressure fuel suction port 51 of the high-pressure fuel supply pump 100 through a low-pressure pipe 104.

The high-pressure fuel supply pump 100 pressurizes the fuel supplied from the fuel tank 103 and pressure-feeds the fuel to the common rail 106. The plurality of injectors 107 and a fuel pressure sensor 105 are mounted on the common rail 106. The plurality of injectors 107 are mounted in accordance with the number of cylinders (combustion chambers), and inject fuel in accordance with a drive current output from the ECU 101. In the present embodiment, the fuel supply system is a so-called direct injection engine system in which the injector 107 directly injects fuel into a cylinder of the engine.

The fuel pressure sensor 105 outputs the detected pressure data to the ECU 101. The ECU 101 calculates an appropriate injection fuel amount (target injection fuel length), appropriate fuel pressure (target fuel pressure), and the like based on engine state quantities (for example, a crank rotation angle, a throttle opening degree, an engine rotational speed, and fuel pressure) obtained from various sensors.

In addition, the ECU 101 controls driving of the high-pressure fuel supply pump 100 and the plurality of injectors 107 based on the calculation result of the fuel pressure (target fuel pressure) and the like. That is, the ECU 101 includes a pump control unit that controls the high-pressure fuel supply pump 100 and an injector control unit that controls the injector 107.

The high-pressure fuel supply pump 100 includes a pressure pulsation reduction mechanism 9, an electromagnetic suction valve mechanism 3 which is a variable capacity mechanism, a relief valve mechanism 4 (see FIG. 2), and a discharge valve mechanism 8. The fuel flowing from the low-pressure fuel suction port 51 reaches a suction port 31*b* of the electromagnetic suction valve mechanism 3 via the pressure pulsation reduction mechanism 9 and a suction passage 10*b*.

The fuel flowing into the electromagnetic suction valve mechanism 3 passes through a valve portion 32, flows through a suction passage 1*d* formed in the pump body 1, and then flows into the pressurizing chamber 11. The plunger 2 is reciprocally inserted into the pressurizing chamber 11. Power is transmitted to the plunger 2 by a cam 91 (see FIG. 2) of the engine, and thus the plunger 2 reciprocates.

In the pressurizing chamber 11, fuel is sucked from the electromagnetic suction valve mechanism 3 in a downward stroke of the plunger 2, and the fuel is pressurized in an upward stroke. When the fuel pressure in the pressurizing chamber 11 exceeds a predetermined value, the discharge valve mechanism 8 is opened, and the high-pressure fuel is pressure-fed to the common rail 106 via a discharge passage 12*a*. The fuel discharge by the high-pressure fuel supply pump 100 is operated by opening and closing the electromagnetic suction valve mechanism 3. The opening and closing of the electromagnetic suction valve mechanism 3 is controlled by the ECU 101.

[High-Pressure Fuel Supply Pump]

Next, a configuration of the high-pressure fuel supply pump 100 will be described with reference to FIGS. 2 to 6.

Figure 2:
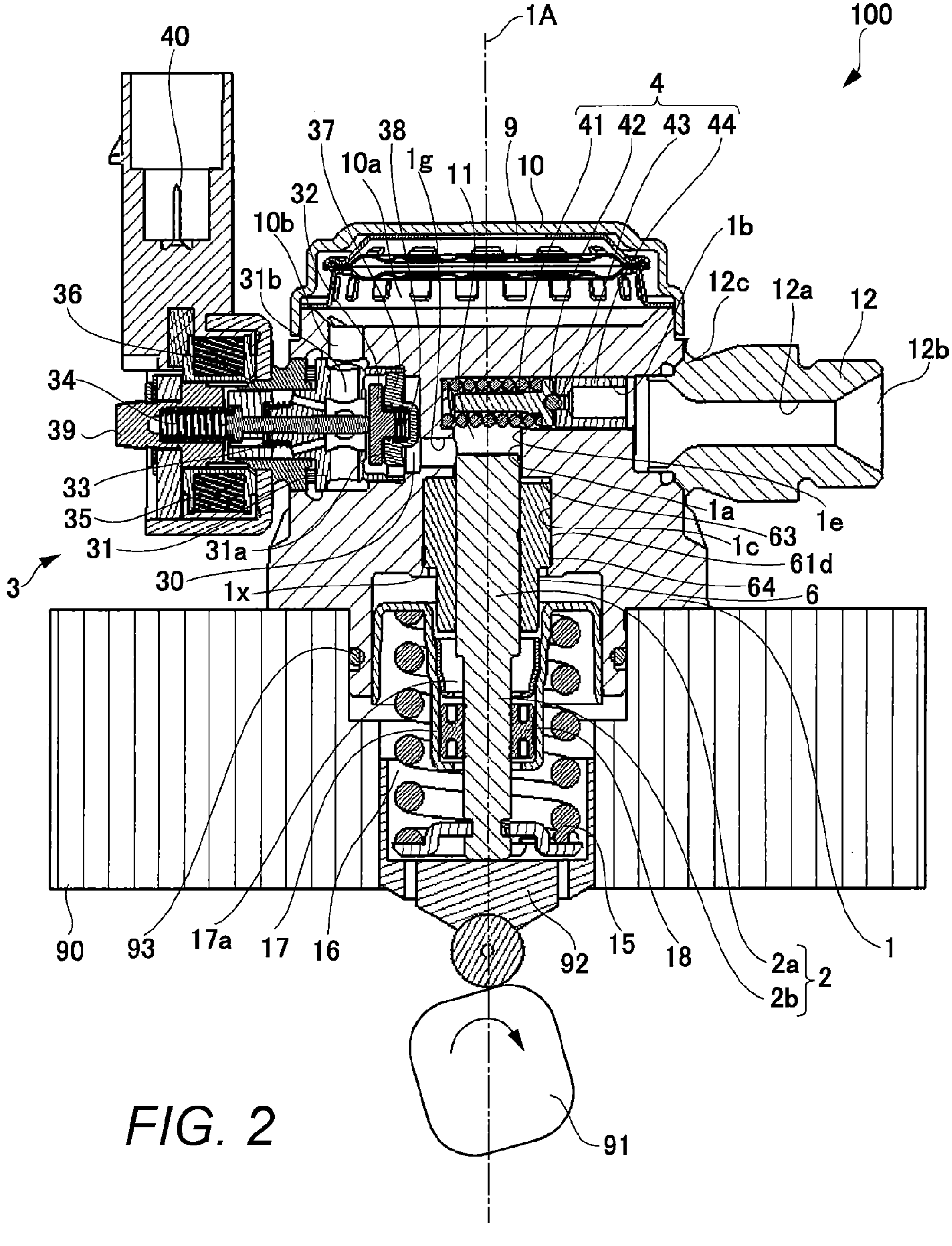
FIG. 2 is a longitudinal cross-sectional view (part 1) of the high-pressure fuel supply pump according to the first embodiment of the present invention.
Figure 3:
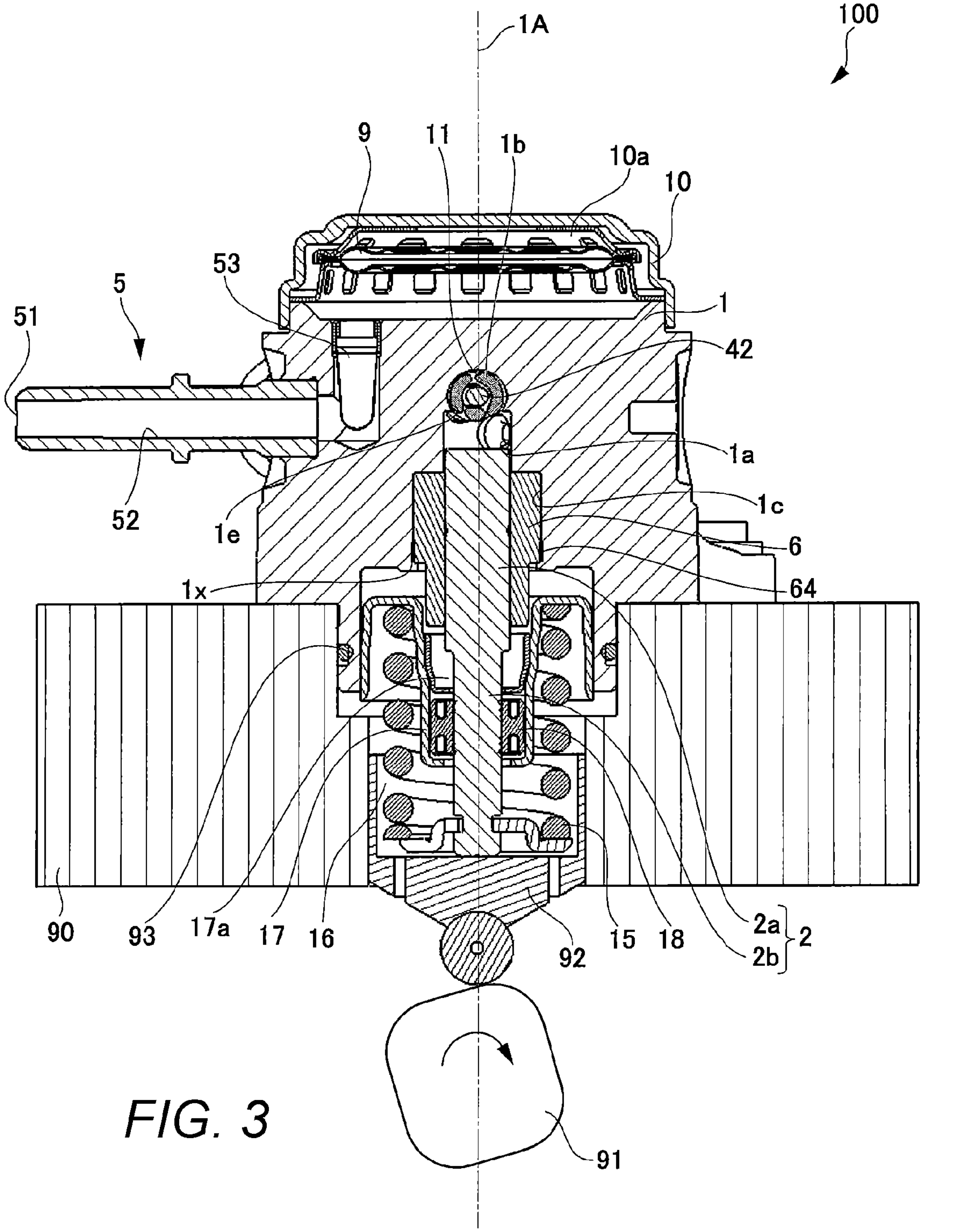
FIG. 3 is a longitudinal cross-sectional view (part 2) of the high-pressure fuel supply pump according to the first embodiment of the present invention.
Figure 4:
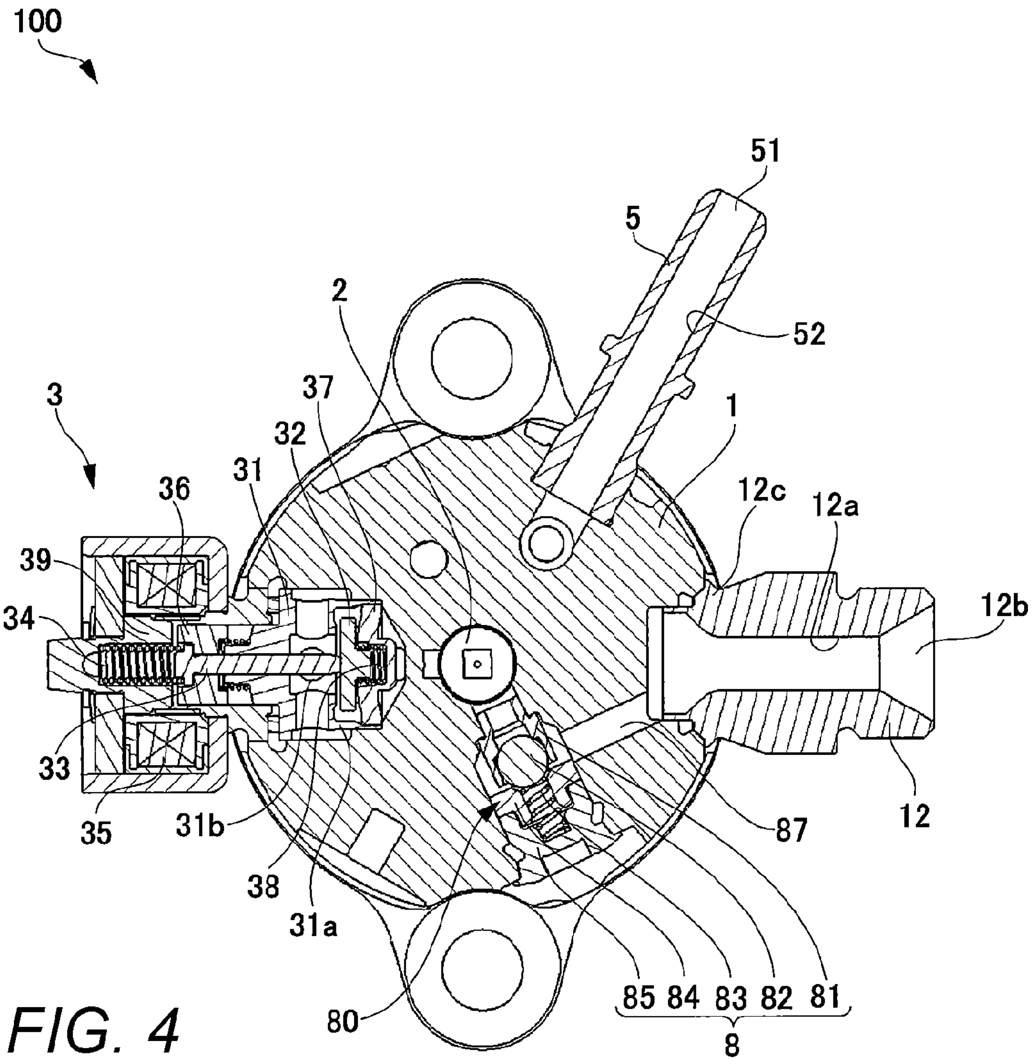
FIG. 4 is a longitudinal cross-sectional view (part 3) of the high-pressure fuel supply pump according to the first embodiment of the present invention.
Figure 5:
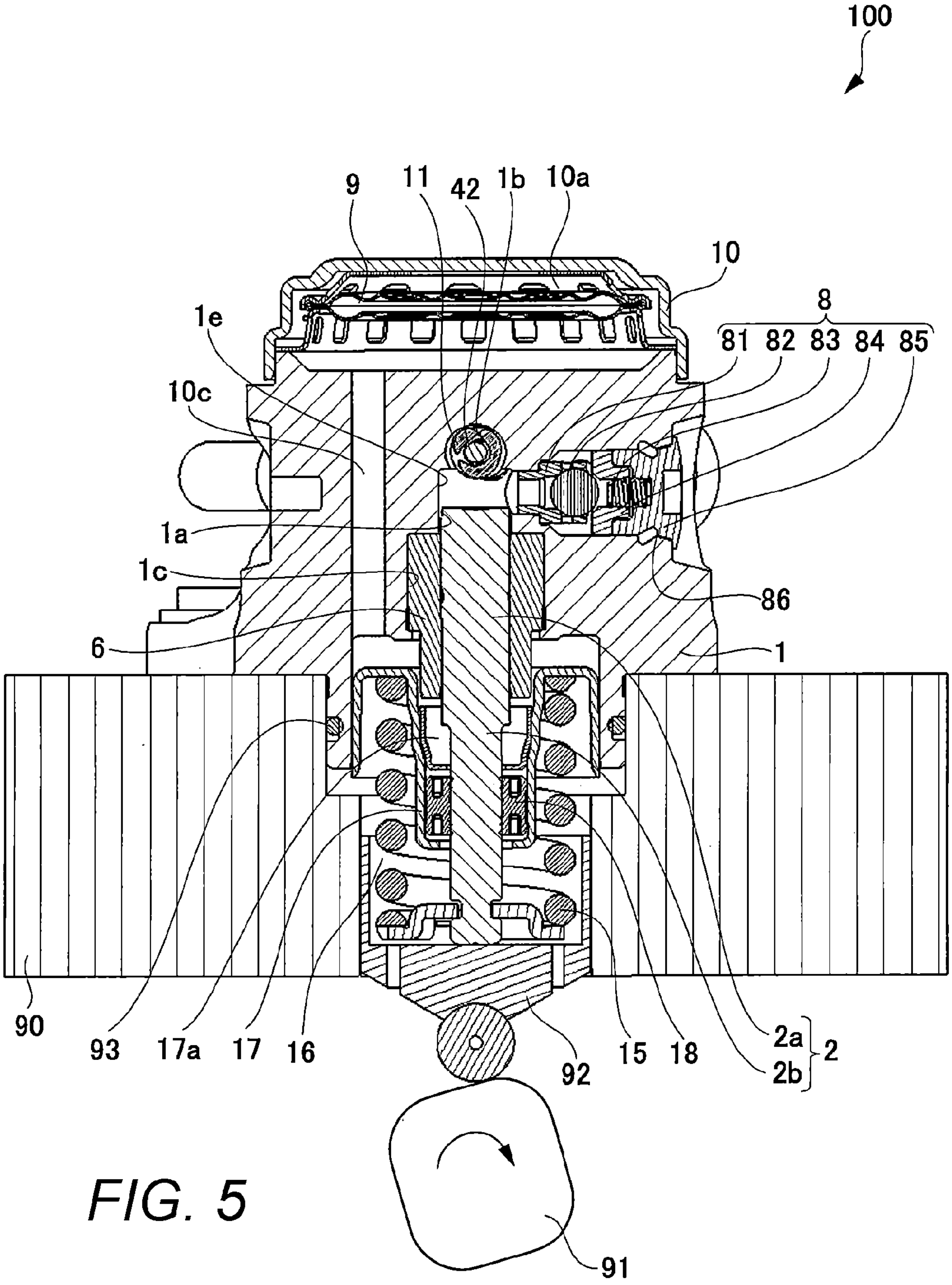
FIG. 5 is a horizontal cross-sectional view of the high-pressure fuel supply pump according to the first embodiment of the present invention when viewed from the top.
Figure 6:
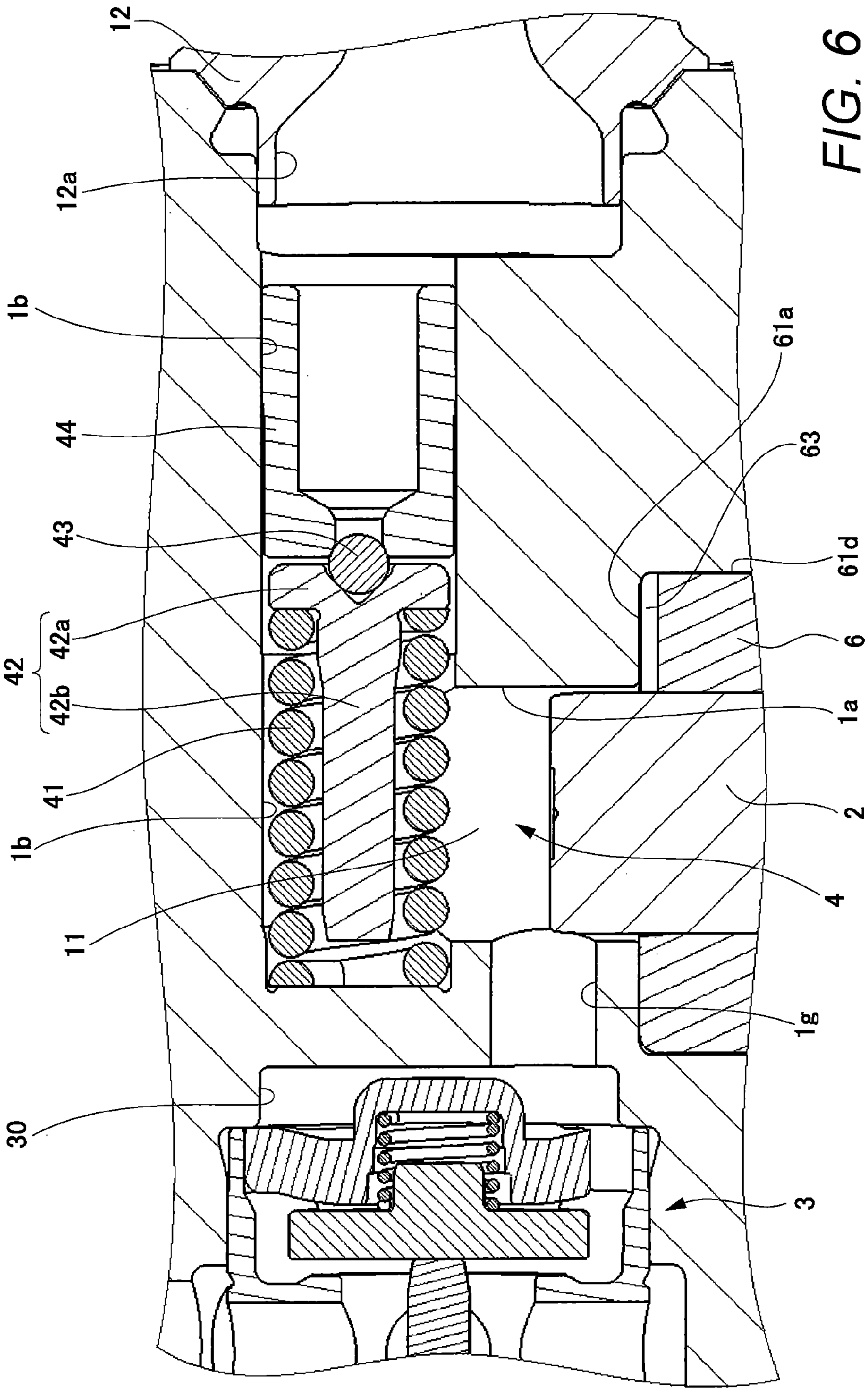
FIG. 6 is an enlarged explanatory view illustrating a pressurizing chamber in the high-pressure fuel supply pump according to the first embodiment of the present invention.

FIG. 2 is a longitudinal cross-sectional view (part 1) of the high-pressure fuel supply pump 100 when viewed in a cross section perpendicular to a horizontal direction. FIG. 3 is a longitudinal cross-sectional view (part 2) of the high-pressure fuel supply pump 100 when viewed in a cross section perpendicular to the horizontal direction. FIG. 4 is a horizontal cross-sectional view of the high-pressure fuel supply pump 100 when viewed in a cross section perpendicular to a vertical direction. FIG. 5 is a longitudinal cross-sectional view (part 3) of the high-pressure fuel supply pump 100 when viewed in a cross section perpendicular to the horizontal direction. FIG. 6 is an enlarged explanatory view illustrating the relief valve mechanism 4.

As illustrated in FIG. 2, the pump body 1 of the high-pressure fuel supply pump 100 is formed in a substantially columnar shape. As illustrated in FIGS. 2 and 3, the pump body 1 includes a first room 1*a*, a second room 1*b*, a third room 1*c*, and the suction passage 1*d*. The pump body 1 is in close contact with a fuel pump attachment portion and is fixed by a plurality of bolts (screws) (not illustrated).

The first room 1*a* is a columnar space portion provided in the pump body 1. The center line 1A of the first room 1*a* coincides with the center line of the pump body 1. One end portion of the plunger 2 is inserted into the first room 1*a*, and the plunger 2 reciprocates in the first room 1*a*. The first room 1*a* and the one end of the plunger 2 form the pressurizing chamber 11.

The second room 1*b* is a columnar space portion provided in the pump body 1. The center line of the second room 1*b* is perpendicular to the center line of the pump body 1 (first room 1*a*). A relief valve chamber in which the relief valve mechanism 4 is disposed is formed in the second room 1*b*. The diameter of the second room 1*b* (relief valve chamber) is smaller than the diameter of the first room 1*a*. The first room 1*a* and the second room 1*b* communicate with each other through a circular communication hole 1*e*. The fuel that has passed through the relief valve mechanism 4 passes through the communication hole 1*e* and is brought back to the pressurizing chamber 11.

The third room 1*c* is a columnar space portion provided in the pump body 1 and is continuous with the other end of the first room 1*a*. The center line of the third room 1*c* coincides with the center line 1A of the first room 1*a* and the center line of the pump body 1. The diameter of the third room 1*c* is greater than the diameter of the first room 1*a*. A cylinder 6 that guides the reciprocation of the plunger 2 is disposed in the third room 1*c*. Thus, it is possible to cause the end surface of the cylinder 6 to abut on the step portion (flat portion) between the first room 1*a* and the third room 1*c*, and to prevent the cylinder 6 from being shifted toward the first room 1*a*.

The cylinder 6 is formed in a tubular shape, and is press-fitted into the third room 1*c* of the pump body 1 on the outer peripheral side thereof. One end of the cylinder 6 abuts on the top surface (step portion between the first room 1*a* and the third room 1*c*) of the third room 1*c*. The plunger 2 is slidably in contact with the inner peripheral surface of the cylinder 6. A detailed shape of the cylinder 6, a method of fixing the cylinder 6 to the pump body 1, and the like will be separately described with reference to FIG. 7.

The pump body 1 is provided with a fixing portion 1*x* that engages with a substantially central portion of the cylinder 6 in the axial direction. The fixing portion 1*x* is formed to be plastically deformable. The fixing portion 1*x* presses the cylinder 6 upward (upward in FIG. 2).

An O-ring 93 showing a specific example of a seat member is interposed between the fuel pump attachment portion 90 and the pump body 1. The O-ring 93 prevents engine oil from leaking to the outside of the engine (internal combustion engine) through a space between the fuel pump attachment portion 90 and the pump body 1.

A tappet 92 is provided at the lower end of the plunger 2. The tappet 92 converts rotational motion of a cam 91 attached to a cam shaft of the engine into an up-down motion and transfers the up-down motion to the plunger 2. The plunger 2 is biased toward the cam 91 by a spring 16 via a retainer 15, and is crimped to the tappet 92. The tappet 92 reciprocates with the rotation of the cam 91. The plunger 2 reciprocates together with the tappet 92 to change the volume of the pressurizing chamber 11.

A seal holder 17 is disposed between the cylinder 6 and the retainer 15. The seal holder 17 is formed in a tubular shape into which the plunger 2 is inserted, and has an auxiliary room 17*a* at the upper end portion on the cylinder 6 side. The seal holder 17 holds a plunger seal 18 at the lower end portion on the retainer 15 side.

The plunger seal 18 is slidably in contact with the outer periphery of the plunger 2. When the plunger 2 reciprocates, the plunger seal 18 seals the fuel in the auxiliary room 17*a*, and thus the fuel in the auxiliary room 17*a* does not flow into the engine. In addition, the plunger seal 18 prevents lubricating oil (including engine oil) that lubricates a sliding portion in the engine from flowing into the pump body 1.

In FIG. 2, the plunger 2 reciprocates in an up-down direction. When the plunger 2 descends, the volume of the pressurizing chamber 11 increases. When the plunger 2 rises, the volume of the pressurizing chamber 11 decreases. That is, the plunger 2 is disposed to reciprocate in a direction of enlarging and reducing the volume of the pressurizing chamber 11.

The plunger 2 has a large-diameter portion 2*a* and a small-diameter portion 2*b*. When the plunger 2 reciprocates, the large-diameter portion 2*a* and the small-diameter portion 2*b* are located in the auxiliary room 17*a*. Therefore, the volume of the auxiliary room 17*a* increases or decreases by the reciprocation of the plunger 2.

The auxiliary room 17*a* communicates with a low-pressure fuel room 10 through a fuel passage 10*c* (see FIG. 5). When the plunger 2 descends, the fuel flows from the auxiliary room 17*a* to the low-pressure fuel room 10. When the plunger 2 rises, the fuel flows from the low-pressure fuel room 10 to the auxiliary room 17*a*. Thus, it is possible to reduce the fuel flow rate into and out of the pump in the suction stroke or the return stroke of the high-pressure fuel supply pump 100, and it is possible to reduce pressure pulsation generated in the high-pressure fuel supply pump 100.

As illustrated in FIG. 3, the low-pressure fuel room 10 is provided at the upper portion of the pump body 1 of the high-pressure fuel supply pump 100. A suction joint 5 is attached to a side surface portion of the pump body 1. The suction joint 5 is connected to a low-pressure pipe 104 through which fuel supplied from the fuel tank 103 (see FIG. 1) passes. The fuel in the fuel tank 103 is supplied from the suction joint 5 into the pump body 1.

The suction joint 5 includes a low-pressure fuel suction port 51 connected to a low-pressure pipe 104, and a suction flow path 52 communicating with the low-pressure fuel suction port 51.

The fuel that has passed through the suction flow path 52 passes through a suction filter 53 provided inside the pump body 1, and then is supplied to the low-pressure fuel room 10. The suction filter 53 removes foreign substances in the fuel and prevents entering of foreign substances into the high-pressure fuel supply pump 100.

The low-pressure fuel room 10 is provided with a low-pressure fuel flow path 10*a* and the suction passage 10*b* (see FIG. 2). The pressure pulsation reduction mechanism 9 is provided in the low-pressure fuel flow path 10*a*. When the fuel flowing into the pressurizing chamber 11 is brought back to the suction passage 10*b* through the electromagnetic suction valve mechanism 3 which is again in a valve open state, the pressure pulsation is generated in the low-pressure fuel room 10. The pressure pulsation reduction mechanism 9 reduces spreading of the pressure pulsation generated in the high-pressure fuel supply pump 100 to the low-pressure pipe 104.

The pressure pulsation reduction mechanism 9 is formed by a metal diaphragm damper in which two corrugated disk-shaped metal plates are bonded to each other at the outer periphery thereof, and an inert gas such as argon is injected. The metal diaphragm damper of the pressure pulsation reduction mechanism 9 expands and contracts to absorb or reduce the pressure pulsation.

The suction passage 10*b* communicates with the suction port 31*b* (see FIG. 2) of the electromagnetic suction valve mechanism 3. The fuel passing through the low-pressure fuel flow path 10*a* reaches the suction port 31*b* of the electromagnetic suction valve mechanism 3 via the suction passage 10*b*.

As illustrated in FIGS. 2 and 4, the electromagnetic suction valve mechanism 3 is inserted into a suction valve chamber 30 formed in the pump body 1. The suction valve chamber 30 is provided on an upstream side (on the suction passage 10*b* side) of the pressurizing chamber 11, and is formed in a lateral hole extending in a horizontal direction. The electromagnetic suction valve mechanism 3 includes a suction-valve seat 31 press-fitted into the suction valve chamber 30, a valve portion 32, a rod 33, a rod biasing spring 34, an electromagnetic coil 35, and an anchor 36.

The suction-valve seat 31 is formed in a tubular shape, and a seating portion 31*a* is provided on an inner peripheral portion. The suction port 31*b* that reaches the inner peripheral portion from the outer peripheral portion is formed in the suction-valve seat 31. The suction port 31*b* communicates with the suction passage 10*b* in the low-pressure fuel room 10 described above.

A stopper 37 facing the seating portion 31*a* of the suction-valve seat 31 is disposed in the suction valve chamber 30. The valve portion 32 is disposed between the stopper 37 and the seating portion 31*a*. The valve biasing spring 38 is interposed between the stopper 37 and the valve portion 32. The valve biasing spring 38 biases the valve portion 32 toward the seating portion 31*a*.

When the valve portion 32 abuts on the seating portion 31*a*, a communicating portion between the suction port 31*b* and the pressurizing chamber 11 is closed. When the valve portion 32 closes the communicating portion between the suction port 31*b* and the pressurizing chamber 11, the electromagnetic suction valve mechanism 3 turns into a valve close state. On the other hand, when the valve portion 32 abuts on the stopper 37, the communicating portion between the suction port 31*b* and the pressurizing chamber 11 is opened. When the valve portion 32 opens the communicating portion between the suction port 31*b* and the pressurizing chamber 11, the electromagnetic suction valve mechanism 3 turns into a valve open state.

The rod 33 penetrates a cylindrical hole of the suction-valve seat 31, and one end thereof abuts on the valve portion 32. The rod biasing spring 34 biases the valve portion 32 in a valve opening direction which is the stopper 37 side, via the rod 33. One end of the rod biasing spring 34 is engaged with the other end of the rod 33, and the other end of the rod biasing spring 34 is engaged with a magnetic core 39 disposed to surround the rod biasing spring 34.

The anchor 36 faces the end surface of the magnetic core 39. The anchor 36 is engaged with a flange provided in an intermediate portion of the rod 33. The electromagnetic coil 35 is disposed around the magnetic core 39. A terminal member 40 is electrically connected to the electromagnetic coil 35, and a current flows through the terminal member 40.

In a non-energized state in which no current flows through the electromagnetic coil 35, the rod 33 is biased in the valve opening direction by the biasing force of the rod biasing spring 34, and presses the valve portion 32 in the valve opening direction. As a result, the valve portion 32 is separated from the seating portion 31*a* and abuts on the stopper 37, and thus the electromagnetic suction valve mechanism 3 turns into the valve open state. That is, the electromagnetic suction valve mechanism 3 is a normally open type that opens in the non-energized state.

In the valve open state of the electromagnetic suction valve mechanism 3, the fuel in the suction port 31*b* passes between the valve portion 32 and the seating portion 31*a*, passes through a plurality of fuel passage holes (not illustrated) of the stopper 37 and the suction passage 1*d*, and then flows into the pressurizing chamber 11. In the valve open state of the electromagnetic suction valve mechanism 3, the valve portion 32 comes into contact with the stopper 37, and thus the position of the valve portion 32 in the valve opening direction is regulated. A gap between the valve portion 32 and the seating portion 31*a* in the valve open state of the electromagnetic suction valve mechanism 3 means a movable range of the valve portion 32, and this is a valve opening stroke.

When a current flows through the electromagnetic coil 35, the anchor 36 is attracted in a valve closing direction by a magnetic attraction force of the magnetic core 39. As a result, the anchor 36 moves against the biasing force of the rod biasing spring 34 and comes into contact with the magnetic core 39. When the anchor 36 moves in the valve closing direction on the magnetic core 39 side, the rod 33 with which the anchor 36 is engaged moves together with the anchor 36. As a result, the valve portion 32 is released from the biasing force in the valve opening direction, and moves in the valve closing direction by the biasing force of the valve biasing spring 38. When the valve portion 32 comes into contact with the seating portion 31*a* of the suction-valve seat 31, the electromagnetic suction valve mechanism 3 turns into a valve close state.

As illustrated in FIGS. 4 and 5, the discharge valve mechanism 8 is disposed in a discharge valve chamber 80 provided on the outlet side (downstream side) of the pressurizing chamber 11. The discharge valve mechanism 8 includes a discharge-valve seat 81 communicating with the pressurizing chamber 11, a valve portion 82 that is in contact with and separated from the discharge-valve seat 81, a discharge valve spring 83 for biasing the valve portion 82 toward the discharge-valve seat 81, and a discharge valve stopper 84 that determines a stroke (moving distance) of the valve portion 82.

The discharge valve mechanism 8 includes a plug 85 that blocks leakage of fuel to the outside. The discharge valve stopper 84 is press-fitted into the plug 85. The plug 85 is joined to the pump body 1 by welding at a welded portion 86. The discharge valve chamber 80 is opened and closed by the valve portion 82. The discharge valve chamber communicates with a discharge valve chamber passage 87. The discharge valve chamber passage 87 is formed in the pump body 1.

The pump body 1 is provided with a lateral hole communicating with the second room 1*b* (relief valve chamber) illustrated in FIG. 2, and a discharge joint 12 is inserted into the lateral hole. The discharge joint 12 includes the above-described discharge passage 12*a* communicating with the lateral hole of the pump body 1 and the discharge valve chamber passage 87, and a fuel discharge port 12*b* which is one end of the discharge passage 12*a*. The fuel discharge port 12*b* of the discharge joint 12 communicates with the common rail 106. The discharge joint 12 is fixed to the pump body 1 by welding by a welded portion 12*c*.

In a state where there is no difference in fuel pressure (fuel differential pressure) between the pressurizing chamber 11 and the discharge valve chamber 80 (discharge valve chamber passage 87), the valve portion 82 is pressed against the discharge-valve seat 81 by the biasing force of the discharge valve spring 83, and thus the discharge valve mechanism 8 turns into the valve close state. When the fuel pressure in the pressurizing chamber 11 becomes greater than the fuel pressure in the discharge valve chamber 80 (discharge valve chamber passage 87), the valve portion 82 moves against the biasing force of the discharge valve spring 83, and thus the discharge valve mechanism 8 turns into the valve open state.

When the discharge valve mechanism 8 turns into the valve open state, the (high-pressure) fuel in the pressurizing chamber 11 passes through the discharge valve mechanism 8 and reaches the discharge valve chamber 80 (discharge valve chamber passage 87). Then, the fuel that has reached the discharge valve chamber passage 87 is discharged to the common rail 106 (see FIG. 1) via the fuel discharge port 12*b* of the discharge joint 12. With the above configuration, the discharge valve mechanism 8 functions as a check valve that restricts a flowing direction of the fuel.

The relief valve mechanism 4 illustrated in FIGS. 2 and 6 is a valve configured to operate and bring the fuel in the discharge passage 12*a* back to the pressurizing chamber 11, when some problem occurs in the common rail 106 or a member ahead of the common rail 106, and thus the common rail becomes a high pressure exceeding a predetermined pressure. The discharge passage 12*a* communicates with the discharge valve chamber 80 via the discharge valve chamber passage 87. Thus, the pressure of the discharge passage 12*a* is equal to the pressure of the discharge valve chamber 80.

The relief valve mechanism 4 turns into the valve open state when a difference between the pressure of the discharge valve chamber 80 (discharge valve chamber passage 87) and the pressure of the second room 1*b* (relief valve chamber) exceeds a set value.

The relief valve mechanism 4 includes a relief spring 41, a relief-valve holder 42, a relief valve 43, and a seat member 44. The relief valve mechanism 4 is inserted from the discharge joint 12 and disposed in the second room 1*b* (relief valve chamber). The relief spring 41 is a coiled spring, and one end portion of the relief spring 41 abuts on the pump body 1 (one end of the second room 1*b*). The other end portion of the relief spring 41 abuts on the relief-valve holder 42. The relief-valve holder 42 is engaged with the relief valve 43. The biasing force of the relief spring 41 acts on the relief valve 43 via the relief-valve holder 42.

The relief-valve holder 42 includes an abutting portion 42*a* and an insertion portion 42*b* continuous with the abutting portion 42*a*. The abutting portion 42*a* is formed in a disk shape having an appropriate thickness. An engagement groove with which the relief valve 43 is engaged is formed on one plane of the abutting portion 42*a*. The insertion portion 42*b* protrudes from the other plane of the abutting portion 42*a*, and the other end portion of the relief spring 41 abuts on the other plane. The insertion portion 42*b* is formed in a columnar shape and is inserted to an inner side of the relief spring 41 in a radial direction.

The relief spring 41 is interposed between one end of the second room 1*b* (around a suction passage 1*d* to be described later) and the abutting portion 42*a* of the relief-valve holder 42 in a compressed state. When the relief spring 41 is compressed, the relief-valve holder 42 and the relief valve 43 are biased toward the seat member 44.

The relief valve 43 is pressed by the biasing force of the relief spring 41 to close the fuel passage of the seat member 44. The movement direction of the relief valve 43 (relief-valve holder 42) is perpendicular to a direction in which the plunger 2 reciprocates, and is the same as the movement direction of the valve portion (suction valve) 32 in the electromagnetic suction valve mechanism 3.

The seat member 44 includes a fuel passage facing the relief valve 43, and a side of the fuel passage on an opposite side of the relief valve 43 communicates with the discharge passage 12*a*. The movement of the fuel between the pressurizing chamber 11 (upstream side) and the seat member 44 (downstream side) is blocked when the relief valve 43 comes into contact (close contact) with the seat member 44 to close the fuel passage.

When the pressure in the discharge valve chamber 80 (discharge valve chamber passage 87), the common rail 106, and members before the discharge valve chamber 80 or the common rail increases, a difference from the pressure of the second room 1*b* (relief valve chamber) exceeds the set value. As a result, the fuel on the seat member 44 side presses the relief valve 43, and moves the relief valve 43 against the biasing force of the relief spring 41. As a result, the relief valve 43 is opened, and the fuel in the discharge passage 12*a* is brought back to the pressurizing chamber 11 through the fuel passage of the seat member 44. Therefore, the pressure for opening the relief valve 43 is determined by the biasing force of the relief spring 41.

[Operation of High-Pressure Fuel Pump]

Next, an operation of the high-pressure fuel pump according to the present embodiment will be described with reference to FIGS. 2 and 4.

In FIG. 2, when the plunger 2 descends, and the electromagnetic suction valve mechanism 3 is opened, the fuel flows from the suction passage 1*d* into the pressurizing chamber 11. A stroke in which the plunger 2 descends is referred to as a suction stroke below. On the other hand, when the plunger 2 rises, and the electromagnetic suction valve mechanism 3 is closed, the fuel in the pressurizing chamber 11 is pressurized, passes through the discharge valve mechanism 8 (see FIG. 4), and is pressure-fed to the common rail 106 (see FIG. 1). A stroke in which the plunger 2 rises is referred to as an upward stroke below.

As described above, if the electromagnetic suction valve mechanism 3 is closed during a rising process, the fuel sucked into the pressurizing chamber 11 during the suction stroke is pressurized and discharged to the common rail 106 side. On the other hand, if the electromagnetic suction valve mechanism 3 is opened during the rising process, the fuel in the pressurizing chamber 11 is pushed back toward the suction passage 1*d* and is not discharged toward the common rail 106. As described above, the fuel discharge by the high-pressure fuel supply pump 100 is operated by opening and closing the electromagnetic suction valve mechanism 3. The opening and closing of the electromagnetic suction valve mechanism 3 is controlled by the ECU 101.

In the suction stroke, the volume of the pressurizing chamber 11 increases, and the fuel pressure in the pressurizing chamber 11 decreases. Thus, the fluid differential pressure (referred to as "fluid differential pressure before and after the valve portion 32" below) between the suction port 31*b* and the pressurizing chamber 11 is reduced. When the biasing force of the rod biasing spring 34 becomes larger than the fluid differential pressure before and after the valve portion 32, the rod 33 moves in the valve opening direction, the valve portion 32 is separated from the seating portion 31*a* of the suction-valve seat 31, and the electromagnetic suction valve mechanism 3 turns into the valve open state.

When the electromagnetic suction valve mechanism 3 is in the valve open state, the fuel in the suction port 31*b* passes between the valve portion 32 and the seating portion 31*a*, passes through a plurality of fuel passage holes (not illustrated) of the stopper 37, and then flows into the pressurizing chamber 11 from the suction passage 1*d* or a supply communication hole 1*g*. In the valve open state of the electromagnetic suction valve mechanism 3, the valve portion 32 comes into contact with the stopper 37, and thus the position of the valve portion 32 in the valve opening direction is regulated. A gap between the valve portion 32 and the seating portion 31*a* in the valve open state of the electromagnetic suction valve mechanism 3 means a movable range of the valve portion 32, and this is a valve opening stroke.

After the suction stroke is ended, the stroke proceeds to the upward stroke. At this time, the electromagnetic coil 35 remains in the non-energized state. Thus, no magnetic attraction force acts between the anchor 36 and the magnetic core 39. A biasing force in the valve opening direction in accordance with a difference in biasing force between the rod biasing spring 34 and the valve biasing spring 38 and a force pressing in the valve closing direction by a fluid force generated when the fuel flows back from the pressurizing chamber 11 to the low-pressure fuel flow path 10*a* act on the valve portion 32.

In this state, in order for the electromagnetic suction valve mechanism 3 to maintain the valve open state, the difference in the biasing force between the rod biasing spring 34 and the valve biasing spring 38 is set to be larger than the fluid force. The volume of the pressurizing chamber 11 decreases as the plunger 2 rises. Therefore, the fuel sucked into the pressurizing chamber 11 passes between the valve portion 32 and the seating portion 31*a* again, and is brought back to the suction port 31*b*. Thus, the pressure in the pressurizing chamber 11 does not increase. Such a stroke is referred to as a return stroke.

In the return process, when a control signal from the ECU 101 (see FIG. 1) is applied to the electromagnetic suction valve mechanism 3, a current flows through the electromagnetic coil 35 via the terminal member 40. When a current flows in the electromagnetic coil 35, a magnetic attractive force acts between the magnetic core 39 and the anchor 36, and the anchor 36 (rod 33) is attracted to the magnetic core 39. As a result, the anchor 36 (rod 33) moves in the valve closing direction (direction away from the valve portion 32) against the biasing force by the rod biasing spring 34.

When the anchor 36 (rod 33) moves in the valve closing direction, the valve portion 32 is released from the biasing force in the valve opening direction, and moves in the valve closing direction by the biasing force of the valve biasing spring 38 and the fluid force caused by the fuel flowing into the suction passage 10*b*. When the valve portion 32 comes into contact with the seating portion 31*a* of the suction-valve seat 31 (the valve portion 32 is seated on the seating portion 31*a*), the electromagnetic suction valve mechanism 3 turns into the valve close state.

After the electromagnetic suction valve mechanism 3 is in the valve close state, the fuel in the pressurizing chamber 11 is pressurized as the plunger 2 rises. When the pressure of the fuel becomes equal to or higher than predetermined pressure, the fuel passes through the discharge valve mechanism 8 and is discharged to the common rail 106 (see FIG. 1). Such a stroke is referred to as a discharge stroke. That is, the upward stroke from the lower start point to the upper start point of the plunger 2 includes the return stroke and the discharge stroke. By controlling the timing of energizing the electromagnetic coil 35 of the electromagnetic suction valve mechanism 3, it is possible to control the amount of high-pressure fuel to be discharged.

If the timing of energizing the electromagnetic coil 35 is made earlier, the ratio of the return stroke during the upward stroke becomes smaller, and the ratio of the discharge stroke becomes larger. As a result, the amount of fuel brought back to the suction passage 10*b* decreases, and the amount of fuel discharged at high pressure increases. On the other hand, if the timing of energizing the electromagnetic coil 35 is delayed, the ratio of the return stroke during the upward stroke increases, and the ratio of the discharge stroke decreases. As a result, the amount of fuel brought back to the suction passage 10*b* increases, and the amount of fuel discharged at a high pressure decreases. As described above, by controlling the timing of energizing the electromagnetic coil 35, it is possible to control the amount of fuel discharged at high pressure to an amount required by the engine (internal combustion engine).

[Shape of Cylinder]

Next, the shape of the cylinder 6 according to the present embodiment will be described with reference to FIG. 7.

Figure 7:
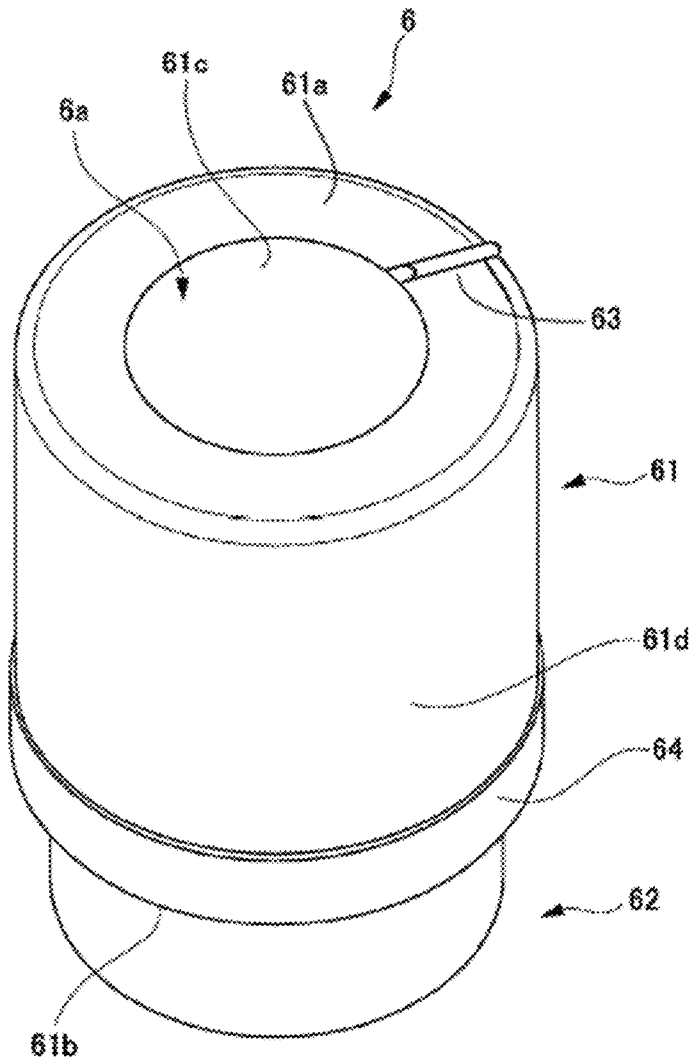
FIG. 7 is a perspective view of a cylinder in the high-pressure fuel supply pump according to the first embodiment of the present invention.

FIG. 7 is a perspective view of the cylinder 6.

As illustrated in FIG. 7, the cylinder 6 is formed in a cylindrical shape having a guide hole 6*a* extending in the axial direction. The cylinder 6 includes a large-diameter portion 61 continuous in the axial direction and a small-diameter portion 62 having a diameter smaller than the diameter of the large-diameter portion 61. The large-diameter portion 61 forms an upper portion of the cylinder 6, and the small-diameter portion 62 forms a lower portion of the cylinder 6.

The large-diameter portion 61 has an end surface 61*a* which is one end (upper end) in the axial direction and an end surface 61*b* which is the other end (lower end) in the axial direction. The large-diameter portion 61 is inserted into the pump body 1 (see FIG. 2). The small-diameter portion 62 is continuous with the end surface 61*b* of the large-diameter portion 61. The small-diameter portion 62 is disposed outside the pump body 1.

The end surface 61*a* of the large-diameter portion 61 is formed in an annular shape. The end surface 61*a* abuts on a step portion (referred to as a "bottom surface of the third room 1*c*" below) between the first room 1*a* and the third room 1*c* in the pump body 1 (see FIG. 2). The end surface 61*a* is provided with a communication passage 63. The communication passage 63 is formed in a groove shape extending in the radial direction of the large-diameter portion 61. The communication passage 63 is set to have a length reaching an outer peripheral surface 61*d* from an inner peripheral surface 61*c* of the large-diameter portion 61. In a state where the cylinder 6 is fixed to the pump body 1, a gap generated between the outer peripheral surface 61*d* of the cylinder 6 and the pump body 1 communicates with the pressurizing chamber 11 (see FIG. 6) via the communication passage 63. The gap generated between the outer peripheral surface 61*d* of the cylinder 6 and the pump body 1 is referred to as a "fixed gap" below.

A press-fitted portion 64 is formed on the outer peripheral surface 61*d* of the large-diameter portion 61. The press-fitted portion 64 is provided on the end surface 61*b* side of the large-diameter portion 61 in the axial direction. The diameter of the press-fitted portion 64 is set to be more than the diameter of the outer peripheral surface 61*d* portion. The press-fitted portion 64 is press-fitted into the third room 1*c* (see FIG. 2) of the pump body 1. The length of the press-fitted portion 64 of the large-diameter portion 61 in the axial direction will be described later.

[Fixing Work of Cylinder to Pump Body]

Next, fixing work of the cylinder 6 to the pump body 1 will be described.

First, the large-diameter portion 61 of the cylinder 6 is inserted into the third room 1*c* of the pump body 1, and the press-fitted portion 64 is press-fitted into the inner peripheral surface of the third room 1*c*. At this time, the end surface 61*a* of the cylinder 6 is pressed against the bottom surface of the third room 1*c*. As a result, the end surface 61*a* comes into contact with the step portion (flat portion) between the first room 1*a* and the third room 1*c*.

Then, a load of several hundred kN is applied to the fixing portion 1*x* of the pump body 1 from below (below in FIG. 2). As a result, the fixing portion 1*x* is plastically deformed, and the cylinder 6 is fixed to the pump body 1. Although the load of several hundred kN is unloaded after the fixing portion 1*x* is plastically deformed, a residual load pressing the end surface 61*a* of the cylinder 6 against the bottom surface of the third room 1*c* is generated even after the load is unloaded.

[Pressure in and Around Cylinder]

Next, the pressure in the cylinder 6 and around the cylinder 6 will be described.

A pressing portion between the end surface 61*a* of the cylinder 6 and the bottom surface of the third room 1*c* is referred to as a "surface pressing portion" below. In order to stabilize the sealability in the surface pressing portion, it is necessary to control not only the roughness and property (property and state) of the surfaces of the end surface 61*a* and the bottom surface of the third room 1*c* but also the value of the residual load. Therefore, it is difficult to stabilize the sealability in the surface pressing portion, and it is possible to prevent the fuel from entering (passing through) in the surface pressing portion of a certain individual, but it is not possible to prevent the fuel from entering (passing through) in the surface pressing portion of another individual.

During the pressurization stroke, the pressure of the pressurizing chamber 11 (see FIG. 2) becomes high. At this time, the pressure of the minute gap generated between the plunger 2 and the cylinder 6 becomes the same as the pressure of the pressurizing chamber 11 at the end portion on the pressurizing chamber 11 side, and gradually decreases toward the side opposite to the pressurizing chamber 11 side. The pressure of the end portion on the side opposite to the pressurizing chamber 11 side in the minute gap generated between the plunger 2 and the cylinder 6 is the same as the pressure of the auxiliary room 17*a*, which is low pressure. The minute gap generated between the plunger 2 and the cylinder 6 is referred to as a "sliding gap" below.

When the fuel can be completely sealed in the surface pressing portion, the fuel in the pressurizing chamber 11 does not reach the fixed gap (the gap generated between the cylinder 6 and the pump body 1). Therefore, the pressure of the sliding gap is higher than the pressure of the fixed gap. Thus, the inner peripheral surface 61*c* of the cylinder 6 is pressed by the fuel, and the sliding gap expands. When the sliding gap expands, the fuel leaking from the sliding gap increases. As a result, the first problem occurs that the discharge amount of the high-pressure fuel is small, or the volumetric efficiency is low, and it is not possible to discharge the fuel of an amount required by the internal combustion engine (engine) at high pressure.

When it is not possible to completely seal the fuel in the surface pressing portion, the fuel in the pressurizing chamber 11 reaches the fixed gap. Therefore, the pressure of the sliding gap is lower than the pressure of the fixed gap. As a result, the outer peripheral surface 61*d* of the cylinder 6 is pressed by the fuel, and the sliding gap becomes small, or the sliding gap becomes zero. When the sliding gap becomes small or becomes zero, the second problem that the plunger 2 and the cylinder 6 stick to each other occurs. When the sliding gap is made small in order to solve the above-described first problem, sticking between the plunger 2 and the cylinder 6 occurs more significantly.

Therefore, as illustrated in FIGS. 2 and 6, in the present embodiment, the communication passage 63 is provided on the end surface 61*a* of the cylinder 6 so that the fuel in the pressurizing chamber 11 always reaches the fixed gap. As a result, the pressure of the fixed gap becomes the same as the pressure of the pressurizing chamber 11. The pressure of the sliding gap is lower than the pressure of the fixed gap.

The fuel entering in the fixed gap is sealed at the press-fitted portion 64 and the fixing portion 1*x*. Thus, the pressure of the fixed gap is not released to the same low pressure as the auxiliary room 17*a*. Therefore, by appropriately setting the position of the press-fitted portion 64 into which the fuel does not enter, it is possible to adjust the difference between the pressure of the fixed gap and the pressure of the sliding gap between the plunger 2 and the cylinder 6, within a predetermined range. As a result, it is possible to suppress the deformation of the cylinder 6 caused by the difference between the pressures.

When the end portion of the press-fitted portion 64 on the pressurizing chamber 11 side is too close to the pressurizing chamber 11, a region where the fuel does not enter increases between the outer peripheral surface 61*d* of the cylinder 6 and the pump body 1. Thus, a region where the pressure of the sliding gap is high faces a region where the pressure of the fixed gap becomes zero. As a result, the inner peripheral surface 61*c* of the cylinder 6 is pressed by the fuel, and the sliding gap expands.

In the present embodiment, the end portion of the press-fitted portion 64 on the pressurizing chamber 11 side is set at a position facing a region where the pressure of the sliding gap is ½ to ⅓ of the pressure of the pressurizing chamber 11. This makes it possible to reduce the difference between the pressure of the fixed gap and the pressure of the sliding gap.

As a result, the pressure of the pressurizing chamber 11 and the pressure of the fixed gap during the pressurization stroke become high pressure, and the pressure of the sliding gap becomes equal to or slightly smaller than the pressure of the pressurizing chamber 11 and the pressure of the fixed gap during the pressurization stroke. Therefore, it is possible to prevent deformation on the inner peripheral surface 61*c* side of the cylinder 6. Alternatively, it is possible to suppress the deformation on the inner peripheral surface 61*c* side of the cylinder 6 to such an extent that no sticking occurs. As a result, it is possible to reduce the amount of fuel flowing out from the pressurizing chamber 11 to the auxiliary room 17*a* through the sliding gap, and to discharge a required amount of fuel at high pressure.

On the other hand, in the return stroke and the suction stroke, the pressure of the pressurizing chamber 11 and the pressure of the fixed gap become low pressure. The pressure of the sliding gap also becomes low pressure. Thus, the sliding gap becomes a default value, and no sticking occurs between the plunger 2 and the cylinder 6. As described above, it is possible to simultaneously solve the first problem and the second problem.

The allowable range of the difference between the pressure of the fixed gap and the pressure of the sliding gap may be set in consideration of the deformation of the cylinder 6 due to the pressure difference. It is possible to appropriately determine the position of the end portion of the press-fitted portion 64 on the pressurizing chamber 11 side in accordance with the pressure of the pressurizing chamber 11 and the allowable range of the pressure difference.

The pressure of the sliding gap is substantially proportional to the distance from the pressurizing chamber 11. That is, the pressure in the sliding gap decreases substantially proportionally as the distance from the pressurizing chamber 11 increases. Therefore, the position of the end portion of the press-fitted portion 64 on the pressurizing chamber 11 side may be set based on a sliding range of the plunger 2.

In the present embodiment, the end portion of the press-fitted portion 64 on the pressurizing chamber 11 side is positioned at a location corresponding to one-third to one-half of the sliding range of the plunger 2. The distance corresponding to one-third to one-half of the sliding range of the plunger 2 is measured from the end surface of the plunger 2 located on the pressurizing chamber side when the plunger 2 is at its bottom dead center position. That is, the end portion of the press-fitted portion 64 on the pressurizing chamber 11 is arranged to face a region where the plunger 2 reaches after rising one-third to one-half of the full stroke from the bottom dead center position. Through this arrangement, the pressure balance between the pressurizing chamber 11 and the fixed gap 65 is more easily maintained, helping suppress leakage through the sliding gap 21 and deformation of the cylinder 6.

2. Second Embodiment

Next, a high-pressure fuel supply pump according to a second embodiment of the present invention will be described with reference to FIG. 8.

Figure 8:
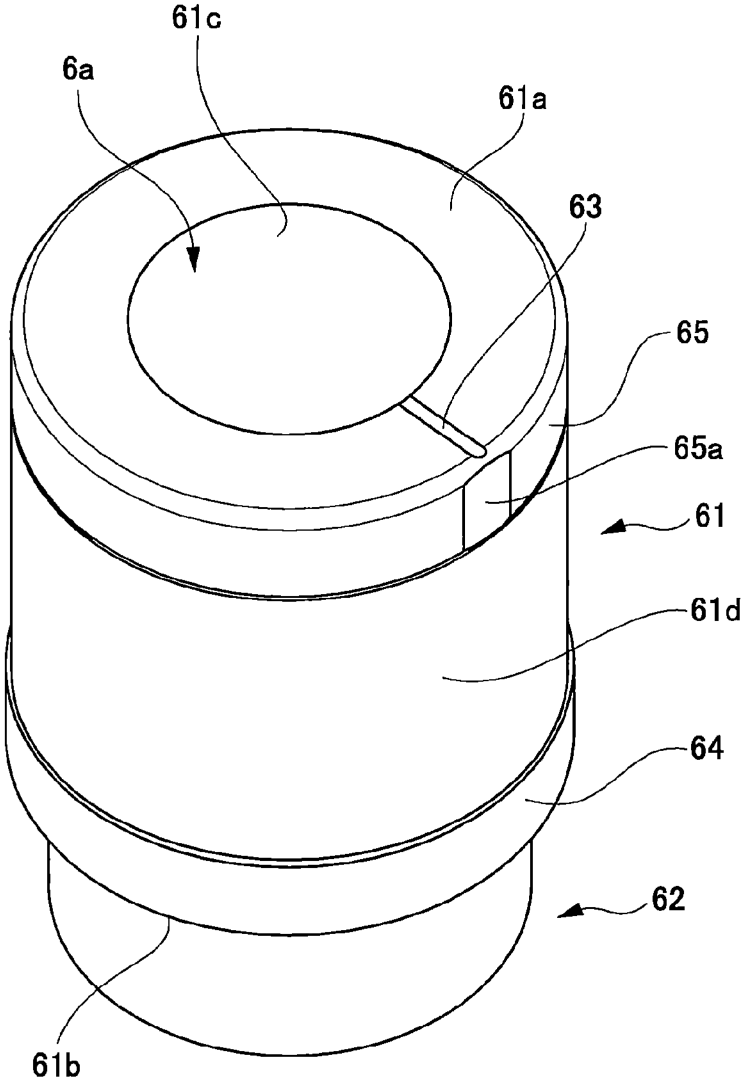
FIG. 8 is a perspective view of a cylinder in a high-pressure fuel supply pump according to a second embodiment of the present invention.

FIG. 8 is a perspective view of a cylinder in the high-pressure fuel supply pump according to the second embodiment.

The high-pressure fuel supply pump according to the second embodiment has the same configuration as the high-pressure fuel supply pump 100 according to the first embodiment. The high-pressure fuel supply pump according to the second embodiment is different from the high-pressure fuel supply pump 100 according to the first embodiment only in a cylinder. Therefore, here, a cylinder 6A according to the second embodiment will be described, and the description of the configuration common to the high-pressure fuel supply pump 100 will be omitted.

[Shape of Cylinder]

As illustrated in FIG. 8, the cylinder 6A is formed in a cylindrical shape having a guide hole 6*a* extending in the axial direction. The cylinder 6A includes a large-diameter portion 61 continuous in the axial direction and a small-diameter portion 62 having a diameter smaller than the diameter of the large-diameter portion 61. The large-diameter portion 61 forms an upper portion of the cylinder 6, and the small-diameter portion 62 forms a lower portion of the cylinder 6.

The large-diameter portion 61 has an end surface 61*a* which is one end (upper end) in the axial direction and an end surface 61*b* which is the other end (lower end) in the axial direction. The large-diameter portion 61 is inserted into the pump body 1 (see FIG. 2). The small-diameter portion 62 is continuous with the end surface 61*b* of the large-diameter portion 61. The small-diameter portion 62 is disposed outside the pump body 1.

The end surface 61*a* of the large-diameter portion 61 is formed in an annular shape. The end surface 61*a* abuts on the bottom surface of the third room 1*c* in the pump body 1 (see FIG. 2). The end surface 61*a* is provided with a communication passage 63. The communication passage 63 is formed in a groove shape extending in the radial direction of the large-diameter portion 61.

A press-fitted portion 64 and a press-fitted portion 65 are formed on the outer peripheral surface 61*d* of the large-diameter portion 61. The press-fitted portion 64 is provided on the end surface 61*b* side of the large-diameter portion 61 in the axial direction. The press-fitted portion 65 is provided on the end surface 61*a* side of the large-diameter portion 61 in the axial direction. That is, the press-fitted portion 64 and the press-fitted portion 65 are disposed on both sides of the outer peripheral surface 61*d* of the large-diameter portion 61 in the axial direction. Thus, a "fixed gap" in the second embodiment is a space (gap) generated between the press-fitted portion 64, the press-fitted portion and the pump body 1 (see FIG. 2).

The diameters of the press-fitted portion 64 and the press-fitted portion 65 are set to be more than the diameter of the outer peripheral surface 61*d* portion. The press-fitted portion 64 and the press-fitted portion 65 are press-fitted into the third room 1*c* (see FIG. 2) of the pump body 1. The length of the press-fitted portion 64 in the axial direction of the large-diameter portion 61 is the same as that of the cylinder 6 in the first embodiment.

The press-fitted portion 65 is provided with a press-fitted portion communication passage 65*a*. The press-fitted portion communication passage 65*a* extends in the axial direction of the large-diameter portion 61. One end of the press-fitted portion communication passage 65*a* reaches the end surface 61*a*, and the other end of the press-fitted portion communication passage 65*a* reaches the outer peripheral surface 61*d*. The communication passage 63 is set to have a length reaching the press-fitted portion from the inner peripheral surface 61*c* of the large-diameter portion 61. In a state where the cylinder 6A is fixed to the pump body 1, the fixed gap communicates via the press-fitted portion communication passage 65*a* and the communication passage 63.

In the case of using such a cylinder 6A, it is possible to obtain the same effects as in the case of using the cylinder 6 according to the first embodiment. That is, the pressure of the pressurizing chamber 11 and the pressure of the fixed gap during the pressurization stroke become high pressure, and the pressure of the sliding gap becomes equal to or slightly smaller than the pressure of the pressurizing chamber 11 and the pressure of the fixed gap during the pressurization stroke. Therefore, it is possible to prevent deformation on the inner peripheral surface 61*c* side of the cylinder 6. Alternatively, it is possible to suppress the deformation on the inner peripheral surface 61*c* side of the cylinder 6A to such an extent that no sticking occurs. As a result, it is possible to reduce the amount of fuel flowing out from the pressurizing chamber 11 to the auxiliary room 17*a* through the sliding gap, and to discharge a required amount of fuel at high pressure.

In addition, in the return stroke and the suction stroke, the pressure of the pressurizing chamber 11 and the pressure of the fixed gap become low pressure. The pressure of the sliding gap also becomes low pressure. Thus, the sliding gap becomes a default value, and no sticking occurs between the plunger 2 and the cylinder 6A. As described above, it is possible to simultaneously solve the first problem and the second problem. Furthermore, since there are two portions to be press-fitted and fixed, it is possible to more firmly fix the cylinder 6A to the pump body 1. As a result, it is possible to reduce the risk that the fixing of the cylinder 6A to the pump body 1 is loosened during the driving of the high-pressure fuel pump according to the second embodiment.

3. Summary

As described above, the high-pressure fuel supply pump 100 (fuel pump) according to the first embodiment described above includes the plunger 2 (plunger) that reciprocates, the cylinder 6 (cylinder) in which the guide hole 6*a* (guide hole) for guiding the reciprocating motion of the plunger 2 extends in the axial direction, the pump body 1 (pump body) including the third room 1*c* (cylinder insertion hole) into which the cylinder 6 is press-fitted, and the pressurizing chamber 11 (pressurizing chamber) that communicates with the third room 1*c* and has a volume that increases or decreases by the reciprocating motion of the plunger 2. The pressure of the fixed gap generated between the cylinder 6 and the pump body 1 is set to be equal to or higher than the pressure of the sliding gap generated between the plunger 2 and the cylinder 6.

Thus, the pressure of the pressurizing chamber 11 and the pressure of the fixed gap during the pressurization stroke become high pressure, and the pressure of the sliding gap becomes equal to or slightly smaller than the pressure of the pressurizing chamber 11 and the pressure of the fixed gap during the pressurization stroke. Therefore, it is possible to suppress the deformation on the guide hole 6*a* side of the cylinder 6 to such an extent that no sticking occurs. As a result, it is possible to reduce the amount of fuel flowing out from the pressurizing chamber 11 to the auxiliary room 17*a* through the sliding gap, and to discharge a required amount of fuel at high pressure. In the return stroke and the suction stroke, the pressure of the pressurizing chamber 11 and the pressure of the fixed gap become low pressure, and the pressure of the sliding gap also becomes low pressure. As a result, the sliding gap becomes a default value, and no sticking occurs between the plunger 2 and the cylinder 6.

The high-pressure fuel supply pump 100 (fuel pump) according to the first embodiment described above has the communication passage 63 (communication passage) that causes the fixed gap to communicate with the pressurizing chamber 11 (pressurizing chamber). Thus, it is possible to easily make the pressure of the fixed gap equal to the pressure of the pressurizing chamber 11. As a result, it is possible to easily set the pressure of the fixed gap to be equal to or higher than the pressure of the sliding gap.

In addition, the cylinder 6 (cylinder) in the high-pressure fuel supply pump 100 (fuel pump) according to the first embodiment described above has the end surface 61*a* (end surface) that comes into contact with the bottom surface of the third room 1*c* (cylinder insertion hole) in the pump body 1 (pump body). The communication passage 63 is formed by providing the groove in the end surface 61*a* of the cylinder 6. Thus, it is possible to easily form the communication passage 63. The communication passage according to the present invention may be formed by providing the protrusion on the end surface 61*a* of the cylinder 6.

The communication passage according to the present invention may be formed by providing the groove or the protrusion on the bottom surface of the third room 1*c* (cylinder insertion hole). Even in this case, it is possible to easily form the communication passage according to the present invention.

In addition, the cylinder 6 (cylinder) in the high-pressure fuel supply pump 100 (fuel pump) according to the first embodiment described above has the press-fitted portion 64 (press-fitted portion) press-fitted into the end portion of the third room 1*c* (cylinder insertion hole) on the side opposite to the pressurizing chamber 11 (pressurizing chamber) side. The position of the end portion of the press-fitted portion 64 on the pressurizing chamber 11 side is set based on the pressure of the pressurizing chamber 11 in the pressurization stroke. As a result, it is possible to appropriately set a region having the same pressure as the pressurizing chamber 11 in the fixed gap. It is possible to keep the difference between the pressure of the fixed gap and the pressure of the sliding gap within a predetermined range.

In addition, the cylinder 6 (cylinder) in the high-pressure fuel supply pump 100 (fuel pump) according to the first embodiment described above has the press-fitted portion 64 (press-fitted portion) press-fitted into the end portion of the third room 1*c* (cylinder insertion hole) on the side opposite to the pressurizing chamber 11 (pressurizing chamber) side. The end portion of the press-fitted portion 64 on the pressurizing chamber 11 side faces the region where the pressure of the sliding gap in the pressurization stroke is ½ to ⅓ of the pressure of the pressurizing chamber 11. This makes it possible to reduce the difference between the pressure of the fixed gap and the pressure of the sliding gap.

In the first embodiment described above, the end portion of the press-fitted portion 64 on the pressurizing chamber 11 side is positioned at a location corresponding to one-third to one-half of the sliding range of the plunger 2 from the bottom dead center of the plunger 2. This positioning reduces the pressure difference between the pressurizing chamber 11 and the sliding gap 21 during operation, contributing to improved sealing and durability of the cylinder 6.

The cylinder 6A (cylinder) in the high-pressure fuel supply pump (fuel pump) according to the second embodiment described above includes the press-fitted portion 64 (first press-fitted portion) press-fitted into the end portion of the third room 1*c* (cylinder insertion hole) on the side opposite to the pressurizing chamber 11 (pressurizing chamber) side and the press-fitted portion 65 (second press-fitted portion) press-fitted into the end portion of the third room 1*c* on the pressurizing chamber 11 side. The fixed gap is a space between the press-fitted portion 64, the press-fitted portion 65, and the pump body 1 (pump body), and includes the communication passage 63 and the press-fitted portion communication passage 65*a* (communication passage) that causes the fixed gap to communicate with the pressurizing chamber 11. Thus, it is possible to easily make the pressure of the fixed gap equal to the pressure of the pressurizing chamber 11. Furthermore, since there are two portions to be press-fitted and fixed, it is possible to more firmly fix the cylinder 6A to the pump body 1.

In addition, the cylinder 6A (cylinder) in the high-pressure fuel supply pump (fuel pump) according to the second embodiment described above has the end surface 61*a* (end surface) that comes into contact with the bottom surface of the third room 1*c* (cylinder insertion hole) in the pump body 1 (pump body). The communication passage 63 and the press-fitted portion communication passage 65*a* (communication passage) are formed by providing grooves in the end surface 61*a* of the cylinder 6 and the press-fitted portion 65 (second press-fitted portion). Thus, it is possible to easily form the communication passage 63 and the press-fitted portion communication passage 65*a*. The communication passage according to the present invention may be formed by providing the protrusion on the end surface 61*a* and the press-fitted portion 65 of the cylinder 6A. The communication passage according to the present invention may be formed by providing the groove or the protrusion on the bottom surface and the inner peripheral surface of the third room 1*c* (cylinder insertion hole).

Hitherto, the fuel pump according to the embodiments of the present invention has been described above including the operational effects thereof. However, the fuel pump in the present invention is not limited to the above-described embodiment, and various modifications can be made without departing from the gist of the invention described in the claims. The above-described embodiments have been described in detail in order to explain the present invention in an easy-to-understand manner, and the above embodiments are not necessarily limited to a case including all the described configurations.

For example, in the above-described embodiments, one communication passage 63 and one press-fitted portion communication passage 65*a* are provided. However, a plurality of communication passages according to the present invention may be provided.

REFERENCE SIGNS LIST

1 pump body
1*a* first room
1*b* second room (relief valve chamber)
1*c* third room
1*d* suction passage (communication hole)
1*e* communication hole
1*g* supply communication hole
1*x* fixing portion
2 plunger
3 electromagnetic suction valve mechanism
4 relief valve mechanism
5 suction joint
6, 6A cylinder
6*a* guide hole
8 discharge valve mechanism
9 pressure pulsation reduction mechanism
10 low-pressure fuel room
11 pressurizing chamber
12 discharge joint
12*a* discharge passage
12*b* fuel discharge port
12*c* welded portion
30 suction valve chamber
61 large-diameter portion
61*a* end surface
61*b* end surface
61*c* inner peripheral surface
61*d* outer peripheral surface
62 small-diameter portion
63 communication passage
64, 65 press-fitted portion
65*a* press-fitted portion communication passage
80 discharge valve chamber
100 high-pressure fuel supply pump
101 ECU
102 feed pump
103 fuel tank
104 low-pressure pipe
105 fuel pressure sensor
106 common rail
107 injector

The invention claimed is:

1. A fuel pump comprising:

a plunger that reciprocates;

a cylinder in which a guide hole for guiding a reciprocating motion of the plunger extends in an axial direction of the cylinder;

a pump body including a cylinder insertion hole and a pressurizing chamber that communicates with the cylinder insertion hole, the pressurizing chamber having a volume that is increased or decreased by the reciprocating motion of the plunger;

a fixed gap;

a sliding gap; and at least one communication passage, wherein the cylinder comprises:

an end surface extending in a radial direction of the cylinder, a lateral surface extending in the axial direction, an inside surface defining the guide hole, and a press-fitted portion;

wherein the cylinder insertion hole has an axis which is coaxial with an axis of the cylinder and the cylinder insertion hole comprises:

a bottom side adjacent to the pressurizing chamber, a top side opposite the bottom side, a bottom surface in the bottom side that extends radially and has an interface with the end surface of the cylinder, and a lateral surface extending axially from the bottom surface toward the top side;

wherein the press-fitted portion of the cylinder is press-fitted into the lateral surface of the cylinder insertion hole and spans an axial length from a top side end to a bottom side end, the bottom side end is an end of the axial length that is nearest to the bottom surface of the cylinder insertion hole, wherein the press-fitted portion is disposed within an annular axial section of the cylinder insertion hole, the annular axial section extending circumferentially around the axis of the cylinder and spanning from the bottom side end to the top side end of the press-fitted portion, wherein the fuel pump has only one annular axial section;

wherein the fixed gap is a substantially enclosed volume formed by the lateral surface of the cylinder, the bottom surface of the cylinder insertion hole, the lateral surface of the cylinder insertion hole, and the bottom side end of the press-fitted portion;

wherein the sliding gap is formed by the plunger and the inside surface of the cylinder and has a pressure distribution that decreases proportionally with axial distance from a higher pressure at a side of the sliding gap adjacent the pressurizing chamber to a lower pressure at a side of the sliding gap opposite the pressurizing chamber;

wherein each said communication passage consists of a channel disposed at the interface between the bottom surface of the cylinder insertion hole and the end surface of the cylinder to directly fluidly connect the fixed gap to the pressurizing chamber whereby pressure throughout the fixed gap and the pressurizing chamber are maintained substantially uniform;

wherein the at least one communication passage is the only fluid communication between the fixed gap and the pressurizing chamber; and wherein the pressure in the fixed gap is set to be equal to or higher than the higher pressure of the pressure distribution in the sliding gap by the at least one communication passage.

2. The fuel pump according to claim 1, wherein the bottom side end of the press-fitted portion has a position set based on at least one of the pressure of the pressurizing chamber during a pressurization stroke of the plunger or a sliding range of the plunger, the sliding range of the plunger being defined by the reciprocating motion of the plunger.

3. The fuel pump according to claim 2, wherein the position of the bottom side end is set within an axial region of the lateral surface of the cylinder that radially corresponds to a region of the sliding gap in which, during the pressurization stroke of the plunger, the pressure in the sliding gap is between one-half and one-third of the pressure in the pressurizing chamber.

4. The fuel pump according to claim 2, wherein the plunger has a top surface that enters the pressurizing chamber during the reciprocating motion of the plunger, wherein the sliding range of the plunger has a bottom dead center position as an end position in which the top surface of the plunger is farthest away from the pressurizing chamber and inside the cylinder insertion hole, and wherein the position of the bottom side end of the press-fitted portion is set within an axial region of the lateral surface of the cylinder that radially corresponds to a region of positions of the top surface of the plunger in which the top surface of the plunger has traveled a distance between one-third and one-half of the sliding range of the plunger from the bottom dead center position toward the pressurizing chamber.

5. A fuel pump comprising:

a plunger that reciprocates;

a cylinder in which a guide hole for guiding a reciprocating motion of the plunger extends in an axial direction of the cylinder;

a pump body including a cylinder insertion hole and a pressurizing chamber that communicates with the cylinder insertion hole, the pressurizing chamber having a volume that is increased or decreased by the reciprocating motion of the plunger;

a fixed gap;

a sliding gap; and at least one communication passage;

wherein the cylinder comprises:

an end surface extending in a radial direction of the cylinder, a lateral surface extending in the axial direction, an inside surface defining the guide hole, and at least one press-fitted portion, wherein the cylinder insertion hole has an axis which is coaxial with an axis of the cylinder and the cylinder insertion hole comprises:

a bottom side adjacent to the pressurizing chamber, a top side opposite the bottom side, a bottom surface in the bottom side that extends radially and has an interface with the end surface of the cylinder, and a lateral surface extending axially from the bottom surface toward the top side;

wherein the at least one press-fitted portion comprises a first press-fitted portion and a second press-fitted portion;

wherein the first press-fitted portion is press-fitted into the lateral surface of the cylinder insertion hole in the top side and spans an axial length from a top side end of the first press-fitted portion to a bottom side end of the first press-fitted portion, the bottom side end of the first press-fitted portion being an end of the axial length of the first press-fitted portion that is nearest to the bottom surface of the cylinder insertion hole;

wherein the second press-fitted portion is press-fitted into the lateral surface of the cylinder insertion hole in the bottom side and spans an axial length from a top side end of the second press-fitted portion to a bottom side end of the second press-fitted portion, the bottom side end of the second press-fitted portion being an end of the axial length of the second press-fitted portion that is nearest to the bottom surface of the cylinder insertion hole;

wherein the fixed gap is a substantially enclosed volume formed by the lateral surface of the cylinder, the lateral surface of the cylinder insertion hole, the bottom side end of the first press-fitted portion, and the top side end of the second press-fitted portion;

wherein the second press-fitted portion has a lateral surface which has an interface with the lateral surface of the cylinder;

wherein the sliding gap is formed by the plunger and the inside surface of the cylinder and has a pressure distribution that decreases proportionally with axial distance form a higher pressure at a side of the sliding gap adjacent the pressurizing chamber to a lower pressure at a side of the sliding gap opposite the pressurizing chamber;

wherein each said communication passage consists of a first channel disposed at the interface between the bottom surface of the cylinder insertion hole and the end surface of the cylinder and a second channel disposed at the interface between the lateral surface of the second press-fitted portion and the lateral surface of the cylinder insertion hole;

wherein the at least one communication passage directly fluidly connects the fixed gap to the pressurizing chamber such that the pressure throughout the fixed gap and the pressurizing chamber are substantially uniform;

wherein the at least one communication passage is the only fluid communication between the fixed gap and the pressurizing chamber; and wherein the pressure in the fixed gap is set to be equal to or higher than the higher pressure of the pressure distribution in the sliding gap by the at least one communication passage.

6. The fuel pump according to claim 5, wherein the second channel is formed by a flattened portion of the lateral surface of the second press-fitted portion.

* * * * *